(12) United States Patent
Fu et al.

(10) Patent No.: US 9,479,283 B2
(45) Date of Patent: Oct. 25, 2016

(54) CHANNEL ESTABLISHMENT METHOD AND DEVICE

(71) Applicant: ZTE CORPORATION, Shenzhen, Guangdong Province (CN)

(72) Inventors: Xihua Fu, Shenzhen (CN); Xinling Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 31 days.

(21) Appl. No.: 14/403,991

(22) PCT Filed: May 14, 2013

(86) PCT No.: PCT/CN2013/075619
§ 371 (c)(1),
(2) Date: Nov. 25, 2014

(87) PCT Pub. No.: WO2013/174219
PCT Pub. Date: Nov. 28, 2013

(65) Prior Publication Data
US 2015/0104175 A1  Apr. 16, 2015

(30) Foreign Application Priority Data
May 25, 2012 (CN) .......................... 2012 1 0166707

(51) Int. Cl.
*H04J 14/02* (2006.01)

(52) U.S. Cl.
CPC ............ *H04J 14/0241* (2013.01); *H04J 14/02* (2013.01); *H04J 14/0267* (2013.01); *H04J 14/0257* (2013.01)

(58) Field of Classification Search
CPC ........................ H04J 14/0241; H04J 14/023
See application file for complete search history.

(56) References Cited

U.S. PATENT DOCUMENTS

| 2008/0279101 A1 | 11/2008 | Wu et al. |
| 2011/0188447 A1* | 8/2011 | Wang ............... H04L 5/0053 370/328 |

(Continued)

FOREIGN PATENT DOCUMENTS

| CN | 1330463 A | 1/2002 |
| CN | 101076961 A | 11/2007 |
| CN | 102439886 A | 5/2012 |

OTHER PUBLICATIONS

International Search Report (Form PCT/ISA/210) for PCT/CN2013/075619 mailed Aug. 15, 2013.

(Continued)

*Primary Examiner* — Dzung Tran
(74) *Attorney, Agent, or Firm* — Koppel, Patrick, Heybl & Philpott (57) ABSTRACT

A channel establishment method and device are provided. The method includes: establishing a media channel between a first node and a second node, wherein the first node is the source node of the media channel, the second node is the destination node of the media channel, and the media channel passes the frequency slot matrix of the one or more intermediate nodes between the first node and the second node and the optical fiber between any two nodes; and allocating frequency spectrum to the media channel from the available frequency spectrum of the optical fiber, wherein the media channel supports at least one single signal frequency slot. The solution can address the problem of how to effectively plan and manage frequency spectrum for an introduced flexible grid technology.

12 Claims, 9 Drawing Sheets

(56) References Cited

U.S. PATENT DOCUMENTS

| | | | | |
|---|---|---|---|---|
| 2011/0205890 A1* | 8/2011 | Kurita | ............... | H04L 45/122 370/230 |
| 2012/0224851 A1* | 9/2012 | Takara | ............ | H04B 10/0793 398/45 |
| 2013/0142510 A1* | 6/2013 | Zhou | ............... | H04J 14/0208 398/48 |
| 2015/0139652 A1* | 5/2015 | Bottari | ............ | H04J 14/0256 398/79 |

OTHER PUBLICATIONS

International Search Report dated Feb. 6, 2015 (Application No. 13794302.3-1860/2858270) (PCT/CN2013075619).

ECOC Technical Digest 2011 OSA article titled "Dynamic Distributed Spectrum Allocation in GMPLS-controlled Elastic Optical Networks" by Raul Munoz, Ramon Casellas and Ricardo Martinez dated Jul. 27, 2011.

ITU Kaleidoscope Conference article titled, "Elastic and Adaptive Optical Networks: Possible Adoption Scenarios and Future Standardization Aspects" by Masahiko Jinno, Takuya Ohara, Yoshiaki Sone, Osamu Ishida, and Masahito Tomizawa, NTT Corporation dated Oct. 2011.

Beyond 100G Optical Communications article titled, "Elastic Optical Networkmg: A New Dawn for the Optical Layer?" by Ori Gerstel, Masahiko Jinno, Andrew Lord and S.J. Ben Yoo dated Feb. 2012.

Network Working Group Memo titled, "GMPLS OSPF-TE Extensions in Support of Flexible-Grid in DWDM Networks" by Fatai Zhang, Xiaobing Zi, Ramon Casellas, O. Gonzalez de Dios, and D. Ceccarelli, dated Oct. 24, 2011.

International Telecommunication Union "Series G: Transmission Systems and Media, Digital Systems and Networks" paper, dated Oct. 2012.

Article from "Technical Digest 2012" titled, "Experimental Assessment of a Combined PCE-RMA and Distributed Spectrum Allocation Mechanism for GMPLS Elastic CO-OFDM Optical Networks" by Ramon Casellas, Raul Munoz, Josep M. Fabrega, Michela Svaluto Moreolo, Ricardo Martinez, Lei Liu, Takehiro Tsuritani and Itsuro Morita.

* cited by examiner

CHANNEL ESTABLISHMENT METHOD AND DEVICE

TECHNICAL FIELD

The disclosure relates to the communication field and more particularly to a channel establishment method and device.

BACKGROUND

With the requirement on the bandwidth of a bearer network becoming higher and higher, a beyond-100G technology becomes a solution to meeting the requirement for higher bandwidth. The Wavelength Division Multiplexing (WDM) of the conventional 50 GHz fixed grid cannot provide a sufficient spectrum width to realize a beyond-100G technology, no matter a 400G technology or a 1T technology.

In view of the defects of the fixed grid, a flexible grid capable of providing wider bandwidth is needed. In related technologies, beyond-100G multi-rate hybrid transmission and the flexibility of the modulation format for beyond-100G transmission have different requirements on channel bandwidth. If a proper bandwidth is customized for each channel, then the bandwidth of a system can be fully used, thereby generating a flexible grid system.

The requirement for an ultra high-speed WDM system brought by the demand for higher and higher bandwidth leads to a demand for a flexible grid technology. However, how to effectively plan and manage frequency spectrum and how to realize the compatibility of the introduced flexible grid technology to existing systems remains to be solved.

No effective solution has been proposed regarding the problem of how to effectively plan and manage frequency spectrum for an introduced flexible grid technology existing in related technologies

SUMMARY

A channel establishment method and device are provided in the embodiments of the disclosure to at least address the problem of how to effectively plan and manage frequency spectrum for an introduced flexible grid technology existing in related technologies.

In accordance with an embodiment of the disclosure, a channel establishment method is provided which includes: establishing a media channel between a first node and a second node, wherein the first node is a source node of the media channel, the second node is a destination node of the media channel, and the media channel passes a frequency slot matrix of one or more intermediate nodes between the first node and the second node and an optical fiber between any two nodes; and allocating frequency spectrum to the media channel from available frequency spectrum of the optical fiber, wherein the media channel supports at least one single signal frequency slot.

The method further includes: establishing a signal channel between a third node and a fourth node, wherein the third node is a source node of the signal channel and the fourth node is a destination node of the signal channel, and the signal channel passes a frequency slot matrix of one or more intermediate nodes between the third node and the fourth node and a traffic engineering link between any two nodes; and allocating frequency spectrum to the signal channel from available frequency spectrum of the traffic engineering link.

The traffic engineering link is formed in the following manner: the traffic engineering link, which supports at least one signal channel, and the available frequency spectrum of which is the same as the frequency spectrum of the media channel, is formed between the first node and the second node in an upper-layer signal network which is corresponding to the lower-layer media network where the media channel exists after the media channel is successfully established.

The traffic engineering link is formed in the following manner: in a case where any two nodes are directly connected with each other merely by an optical fiber, the traffic engineering link, the available frequency spectrum of which is the same as available frequency spectrum of the optical fiber, is formed in an upper-layer signal network which is corresponding to the lower-layer media network where the media channel exists.

After the media channel is established between the first node and the second node, the method further includes: switching one or more frequency slots on the nodes the media channel passes.

After the signal channel is established between the third node and the fourth node, the method further includes: switching one or more single signal frequency slots on the nodes the signal channel passes.

The frequency slot is a fixed or flexible grid.

The single signal frequency slot is a fixed or flexible grid.

The available frequency spectrum of the optical fiber is released to a control plane via a routing protocol in the lower-layer media network where the media channel exists, wherein the optical fiber supports at least one frequency slot; and the available frequency spectrum of the traffic engineering link is released to a control plane via a routing protocol in the upper-layer signal network which is corresponding to the lower-layer media network, wherein the traffic engineering link supports at least one single signal frequency slot.

The routing protocol includes OSPF-TE and ISIS-TE.

In accordance with another embodiment of the disclosure, a channel establishment device is provided which includes: a first establishment component configured to establish a media channel between a first node and a second node, wherein the first node is a source node of the media channel, the second node is a destination node of the media channel, and the media channel passes a frequency slot matrix of one or more intermediate nodes between the first node and the second node and an optical fiber between any two nodes; and a first allocation component configured to allocate frequency spectrum to the media channel from available frequency spectrum of the optical fiber, wherein the media channel supports at least one single signal frequency slot.

The device further includes: a second establishment component configured to establish a signal channel between a third node and a fourth node, wherein the third node is a source node of the signal channel and the fourth node is a destination node of the signal channel, and the signal channel passes a frequency slot matrix of one or more intermediate nodes between the third node and the fourth node and a traffic engineering link between any two nodes; and a second allocation component configured to allocate frequency spectrum to the signal channel from available frequency spectrum of the traffic engineering link.

The device further includes: a forming component configured to form, between the first node and the second node, a traffic engineering link which supports at least one signal channel and the available frequency spectrum of which is the same as the frequency spectrum of the media channel in an upper-layer signal network which is corresponding to the lower-layer media network where the media channel exists after the media channel is successfully established by the first establishment component.

The device further includes: a first configuration component configured to switch one or more frequency slots on the nodes which the media channel established by the first establishment component passes.

The device further includes: a second configuration component configured to switch one or more single signal frequency slots on the nodes which the signal channel established by the second establishment component passes.

The first establishment component is further configured to release the available frequency spectrum of the optical fiber to a control plane via a routing protocol in the lower-layer media network where the media channel exists, wherein the optical fiber supports at least one frequency slot; and the second establishment component is further configured to release the available frequency spectrum of the traffic engineering link to a control plane via a routing protocol in the upper-layer signal network which is corresponding to the lower-layer media network, wherein the traffic engineering link supports at least one single signal frequency slot.

In the embodiments of the disclosure, a media channel supporting at least one single signal frequency slot is established between a first node and a second node and allocated with frequency spectrum from available frequency spectrum of an optical fiber. As a result, the media channel can support at least one single signal frequency slot, thus providing hierarchical management and planning from the point of view of frequency spectrum management. This frequency spectrum management mode can improve the utilization rate of frequency spectrum and rationally plan frequency spectrum resource to improve the overall frequency spectrum utilization rate of the network of the operator and effectively reduce the network management and investment cost of the operator after a flexible grid technology is introduced into a beyond-100G system.

BRIEF DESCRIPTION OF THE DRAWINGS

The accompanying drawings described here are provided for a better understanding of the disclosure and constitute one part of the disclosure, and the exemplary embodiments of the disclosure and description thereof are illustrative of the disclosure but are not to be construed as limiting the disclosure. In the accompanying drawings.

DETAILED DESCRIPTION OF THE EMBODIMENTS

The disclosure is described below in detail with reference to accompanying drawings when read in conjunction with embodiments. It should be noted that embodiments of the disclosure and the features thereof can be combined with each other if no conflict is caused.

It is mentioned in related technologies that the requirement for an ultra high-speed WDM system brought by the demand for higher and higher bandwidth leads to a demand for a flexible grid technology. However, how to effectively plan and manage frequency spectrum and how to realize the compatibility of the introduced flexible grid technology to existing systems remains to be solved.

Figure 1A:
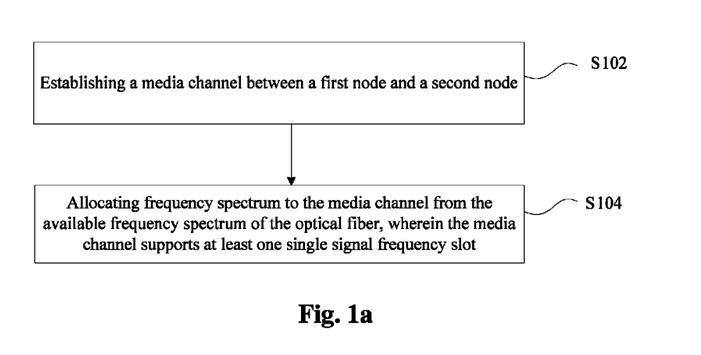
FIG. 1a is a flowchart illustrating a first processing flow of a channel establishment method according to an embodiment of the disclosure.

To address the technical problems above, a channel establishment method is provided in an embodiment of the disclosure. FIG. 1a is a flowchart illustrating a first processing flow of a channel establishment method according to an embodiment of the disclosure. As shown in FIG. 1a, the method specifically includes:

Step S102: establishing a media channel between a first node and a second node;

wherein the first node is the source node of the media channel, the second node is the destination node of the media channel, and the media channel passes the frequency slot matrix of the one or more intermediate nodes between the first node and the second node and the optical fiber between any two nodes;

Step S104: allocating frequency spectrum to the media channel from the available frequency spectrum of the optical fiber, wherein the media channel supports at least one single signal frequency slot.

In the embodiment of the disclosure, a media channel supporting at least one single signal frequency slot is established between a first node and a second node and allocated with frequency spectrum from available frequency spectrum of optical fiber. As a result, the media channel can support at least one single signal frequency slot, thus providing hierarchical management and planning from the point of view of frequency spectrum management. This frequency spectrum management mode can improve the utilization rate of frequency spectrum and rationally plan frequency spectrum resource to improve the overall frequency spectrum utilization rate of the network of the operator and effectively reduce the network management and investment cost of the operator after a flexible grid technology is introduced into a beyond-100G system.

Figure 1B:
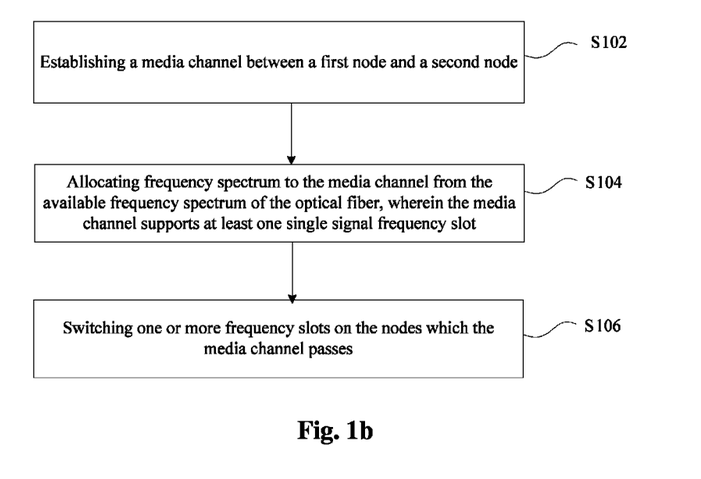
FIG. 1b is a flowchart illustrating a second processing flow of a channel establishment method according to an embodiment of the disclosure.

To guarantee the right-to-know of each node, after the media channel is established between the first node and the second node, one or more frequency slots are switched on the nodes which the media channel passes. In this case, the channel establishment method shown in FIG. 1b can also be obtained on the basis of the channel establishment method shown in FIG. 1a. FIG. 1b is a flow chart illustrating a second processing flow of a channel establishment method according to an embodiment of the disclosure. As shown in FIG. 1b, the flow includes the following steps:

Step S102: establishing a media channel between a first node and a second node;

wherein the first node is the source node of the media channel, the second node is the destination node of the media channel, and the media channel passes the frequency slot matrix of the one or more intermediate nodes between the first node and the second node and the optical fiber between any two nodes;

Step S104: allocating frequency spectrum to the media channel from the available frequency spectrum of the optical fiber, wherein the media channel supports at least one single signal frequency slot;

Step S106: switching one or more frequency slots on the nodes which the media channel passes.

Figure 2A:
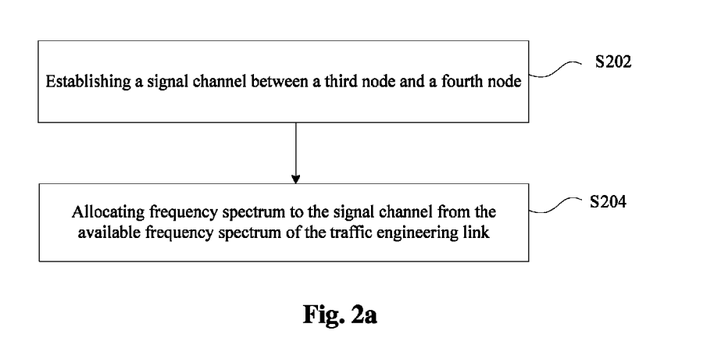
FIG. 2a is a flowchart illustrating a first signal channel establishment flow of a channel establishment method following the establishment of a media channel according to an embodiment of the disclosure.

In the embodiment of the disclosure, to provide hieratical frequency spectrum management in more detail, a signal channel may be created on the basis of the at least one single signal frequency slot supported by the media channel after the media channel is created. FIG. 2a is a flowchart illustrating a first signal channel establishment flow of a channel establishment method following the establishment of a media channel according to an embodiment of the disclosure. As shown in FIG. 2a, the flow includes the following steps:

Step S202: establishing a signal channel between a third node and a fourth node;

wherein the third node is the source node of the signal channel and the fourth node is the destination node of the signal channel, and the signal channel passes the frequency slot matrix of the one or more intermediate nodes between the third node and the fourth node and the traffic engineering link between any two nodes;

Step S204: allocating frequency spectrum to the signal channel from the available frequency spectrum of the traffic engineering link.

Figure 2B:
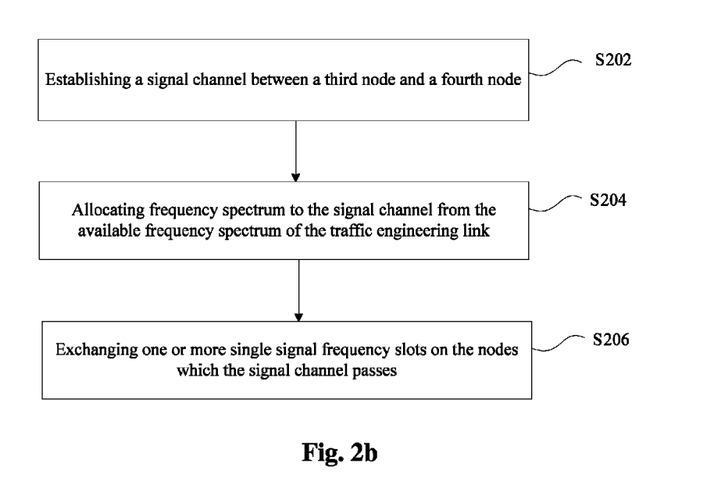
FIG. 2b is a flowchart illustrating a second signal channel establishment flow of a channel establishment method following the establishment of a media channel according to an embodiment of the disclosure.

To guarantee the right-to-know of each node, after the signal channel is established between the third node and the fourth node, one or more frequency slots are switched on the nodes which the signal channel passes. In this case, the channel establishment method shown in FIG. 2b can also be obtained on the basis of the channel establishment method shown in FIG. 2a. FIG. 2b is a flow chart illustrating a second signal channel establishment flow of a channel establishment method following the establishment of a media channel according to an embodiment of the disclosure. As shown in FIG. 2b, the flow includes the following steps:

Step S202: establishing a signal channel between a third node and a fourth node;

wherein the third node is the source node of the signal channel and the fourth node is the destination node of the signal channel, and the signal channel passes the frequency slot matrix of the one or more intermediate nodes between the third node and the fourth node and the traffic engineering link between any two nodes;

Step S204: allocating frequency spectrum to the signal channel from the available frequency spectrum of the traffic engineering link;

Step S206: switching one or more single signal frequency slots on the nodes which the signal channel passes.

A hierarchical frequency spectrum management mode corresponding to the channel establishment flow of FIG. 1 or FIG. 2 can be obtained to manage a beyond-100G network system. For example, an operator expects to establish high-bandwidth media channels (e.g. 500 GHz) which subsequently support a plurality of low-bandwidth signal channels which directly support an Optical Data Unit (ODU)/Optical Channel Transport Unit (OTU)/Optical channel (OCh) signal. By means of such a frequency spectrum management mode, the operator can establish one high-bandwidth media channel between two nodes of an optical network based on a preset frequency spectrum planning, this channel can be shared by a plurality of signal channels, as a result, there is no need to manage signal channels in the network where the media channel exists.

A traffic engineering link is mentioned in both of the Steps 202 and 204, as shown in FIG. 2a and FIG. 2b, here, the traffic engineering link is formed in the following manner: the traffic engineering link, which supports at least one signal channel, and the available frequency spectrum of which is the same as the frequency spectrum of the media channel, is formed between the first node and the second node in an upper-layer signal network which is corresponding to the lower-layer media network where the media channel exists after the media channel is successfully established.

In a case where any two nodes are directly connected with each other merely by an optical fiber, the traffic engineering link, the available frequency spectrum of which is the same as available frequency spectrum of the optical fiber, is directly formed in an upper-layer signal network which is corresponding to the lower-layer media network where the media channel exists.

To guarantee the right-to-know of each node, after the media channel is established between the first node and the second node, one or more frequency slots are switched on the nodes the media channel passes. Similarly, after the signal channel is established between the third node and the fourth node, one or more single signal frequency slots are switched on the nodes the signal channel passes.

In any of the example embodiments above, a flexible grid is introduced to guarantee the management on beyond-100G bandwidth, thus, the frequency slot supported by the media channel may be a fixed or flexible grid. Similarly, the single signal frequency slot supported by the signal channel may be a fixed or flexible grid. The type of the grid selected by the frequency slot and the single signal frequency slot depends on the actual situation.

Figure 3:
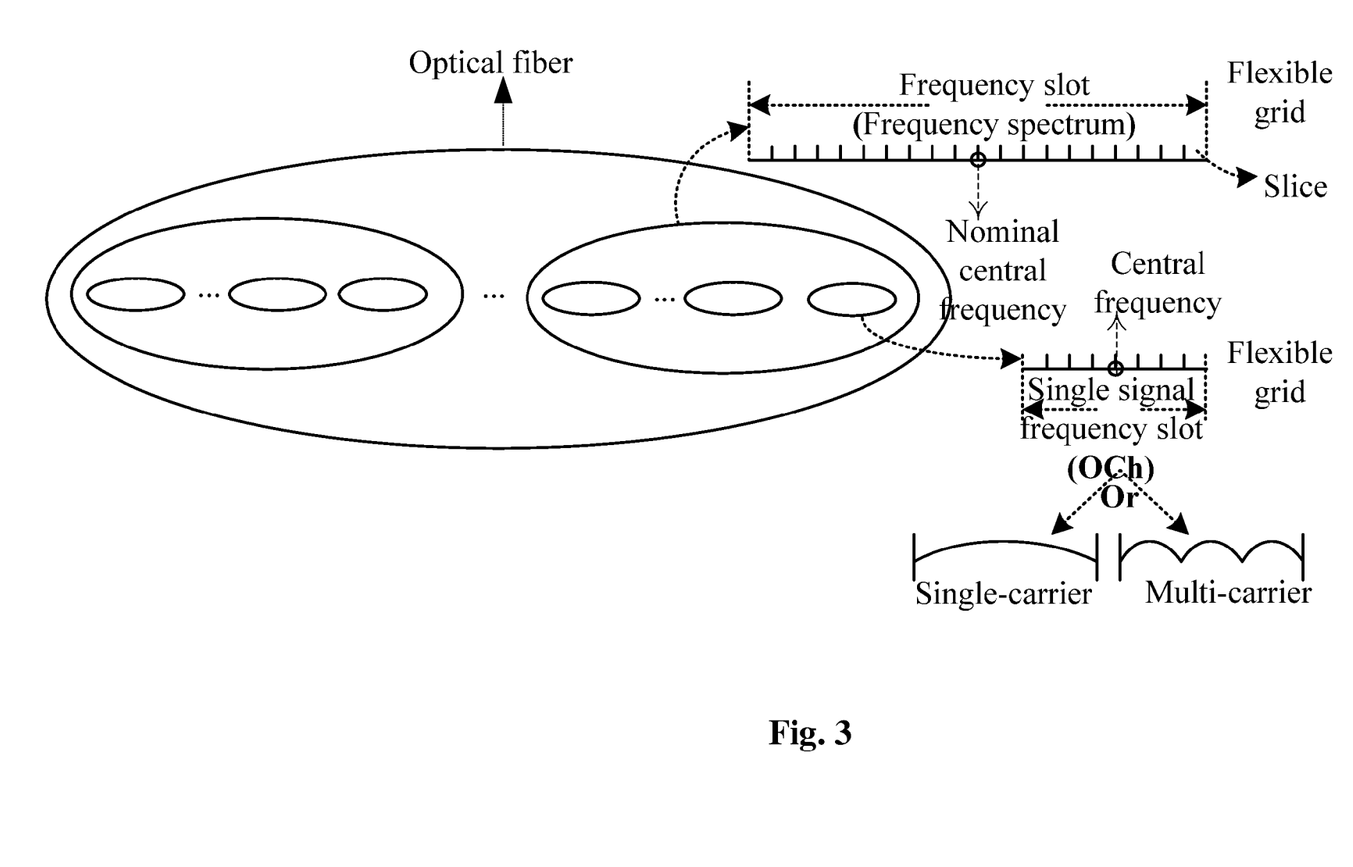
FIG. 3 is a schematic diagram illustrating the management on the frequency spectrum of an optical network using a hierarchy concept according to an embodiment of the disclosure, in which the service layer is frequency slot and the client layer is single signal frequency slot.

After being illustrated theoretically above, the idea of the embodiments of the disclosure is described below with reference to drawings. FIG. 3 is a schematic diagram illustrating the management on the frequency spectrum of an optical network using a hierarchy concept according to an embodiment of the disclosure. FIG. 3 shows the principle of the embodiments of the disclosure, as shown in FIG. 3, one optical fiber is capable of supporting a plurality of frequency slots, the operator may create a plurality of media channels each of which occupies one frequency slot when passing the optical fiber. Each frequency slot is a flexible or fixed grid, and each grid is described with a normal central frequency (that is, a nominal central frequency) and a frequency spectrum width consisting of frequency spectrum slices of the same size. One frequency slot supports a plurality of single signal frequency slots each of which is described with a central frequency and a frequency spectrum width consisting of frequency spectrum slices of the same size. Each single signal frequency slot supports an OCh which may be realized using a single carrier or a multiple carrier technology. In the embodiments of the disclosure, from the perspective of frequency spectrum management, the frequency spectrum of an optical network is managed, planned and configured using a hierarchical frequency spectrum management technology.

In the implementation of the disclosure, after the media channel is established, the available frequency spectrum of the optical fiber is released to a control plane via a routing protocol in the lower-layer media network where the media channel exists, wherein the optical fiber supports at least one frequency slot. Correspondingly, after the signal channel is established, the available frequency spectrum of the traffic engineering link is released to a control plane via a routing protocol in the upper-layer signal network which is corresponding to the lower-layer media network, wherein the traffic engineering link supports at least one single signal frequency slot.

The routing protocol here includes Open Shortest Path First (OSPF)-Traffic Engineering (OSPF-TE) and Intermediate system to Intermediate System (ISIS)-Traffic Engineering (ISIS-TE).

Figure 4:
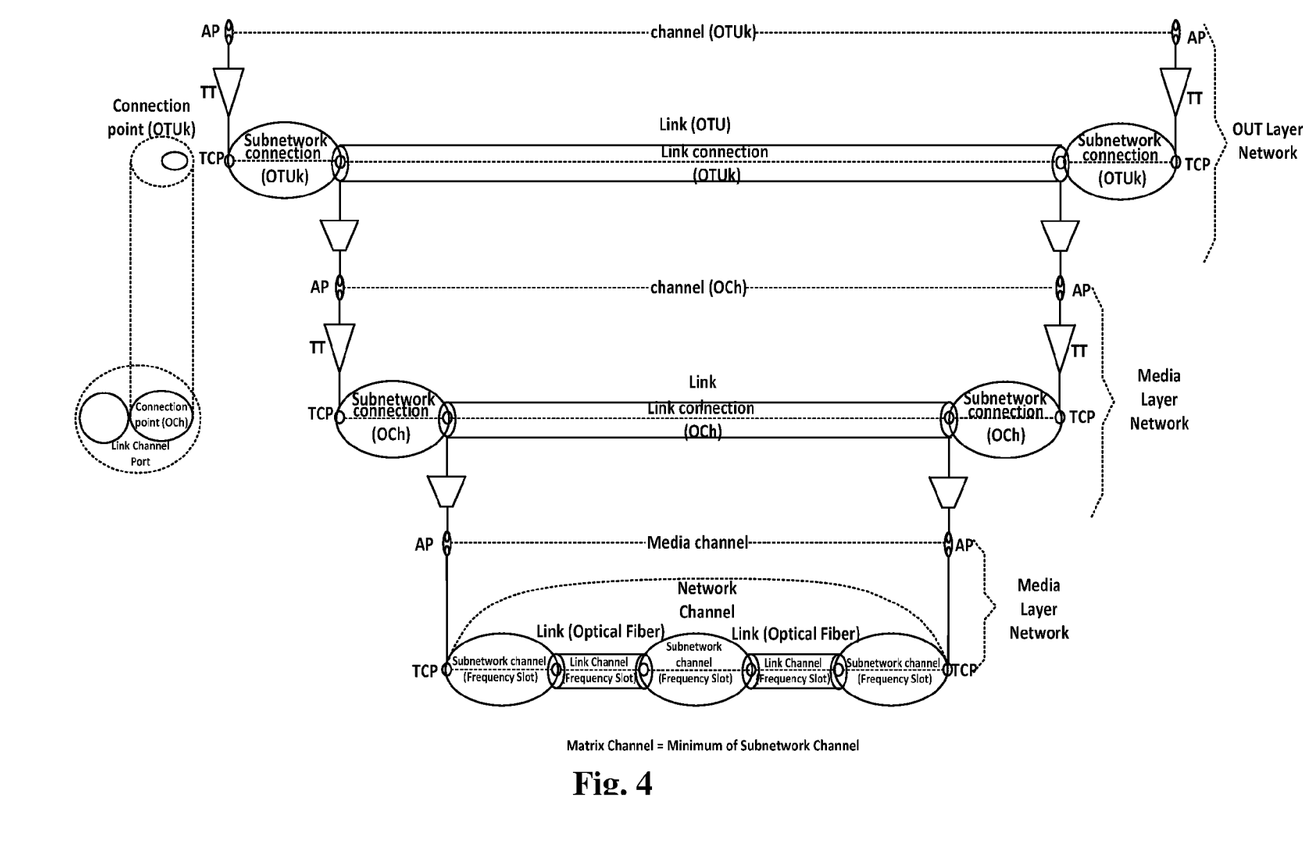
FIG. 4 is a schematic diagram illustrating the architecture of the hierarchical management on the frequency spectrum of an optical network according to an embodiment of the disclosure, in which the media layer network is divided into two layers of network sublayers, that is, a media channel and a signal channel (that is, an Optical Channel-OCh)

FIG. 4 is a schematic diagram illustrating the architecture of the hierarchical management on the frequency spectrum of an optical network after the channel establishment method provided herein and a corresponding frequency spectrum management mode are adopted according to an embodiment of the disclosure. In the hierarchical management architecture for the frequency spectrum of an optical network illustrated in FIG. 4, a media layer network is divided into two layers of network sublayers, that is, a media channel and a signal channel (that is, an Optical Channel-OCh). The media channel is formed by connecting an Access Point (AP), a Termination Connection Point (TCP), the subnetwork Channel of a frequency slot, a connection point and the link channel of a frequency slot in series and may pass one or more intermediate nodes, the optical fibers between nodes and the frequency slot matrix of at least one node. After the media channel is created, one traffic engineering link is formed in an upper-layer signal network; and the signal channel (that is, the OCh) is formed by connecting an AP, a Trail Termination (TT), a Termination Connection Point (TCP), the subnetwork connection of an OCh, a connection point and an the link connection of an OCh in series.

Figure 5:
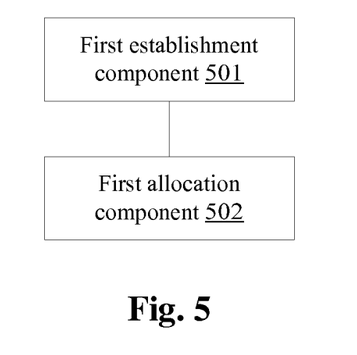
FIG. 5 is a schematic diagram illustrating a first structure of a channel establishment device according to an embodiment of the disclosure.

To support any of the example embodiments above, a channel establishment device is also provided in an embodiment of the disclosure. FIG. 5 is a schematic diagram illustrating a first structure of a channel establishment device according to an embodiment of the disclosure. As shown in FIG. 5, the structure includes:

a first establishment component 501 configured to establish a media channel between a first node and a second node, wherein the first node is the source node of the media channel, the second node is the destination node of the media channel, and the media channel passes the frequency slot matrix of the one or more intermediate nodes between the first node and the second node and the optical fiber between any two nodes; and a first allocation component 502 coupled with the first establishment component 501 and configured to allocate frequency spectrum to the media channel from the available frequency spectrum of the optical fiber, wherein the media channel supports at least one single signal frequency slot.

Figure 6:
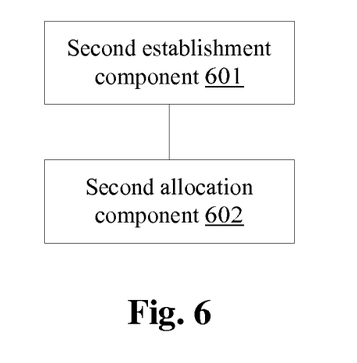
FIG. 6 is a schematic diagram illustrating a second structure of a channel establishment device according to an embodiment of the disclosure.

FIG. 6 is a schematic diagram illustrating a second structure of a channel establishment device according to an embodiment of the disclosure. As shown in FIG. 6, in an example embodiment, the channel establishment device further includes:

a second establishment component 601 configured to establish a signal channel between a third node and a fourth node, wherein the third node is the source node of the signal channel and the fourth node is the destination node of the signal channel, and the signal channel passes the frequency slot matrix of the one or more intermediate nodes between the third node and the fourth node and the traffic engineering link between any two nodes; and a second allocation component 602 coupled with the second establishment component 601 and configured to allocate frequency spectrum to the signal channel from the available frequency spectrum of the traffic engineering link.

If the signal channel is established after the media channel is established, then the second establishment component 601 is coupled with the first establishment component 501; and if the signal channel is established independently, then the second establishment component 601 and the first establishment component 501 are two parallel execution components.

Figure 7:
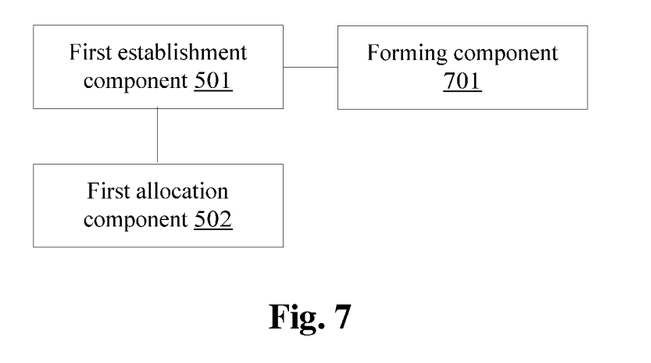
FIG. 7 is a schematic diagram illustrating a third structure of a channel establishment device according to an embodiment of the disclosure.

FIG. 7 is a schematic diagram illustrating a third structure of a channel establishment device according to an embodiment of the disclosure. As shown in FIG. 7, in an example embodiment, the channel establishment device further includes a forming component 701 configured to form, between the first node and the second node, a traffic engineering link which supports at least one signal channel and the available frequency spectrum of which is the same as the frequency spectrum of the media channel in an upper-layer signal network which is corresponding to the lower-layer media network where the media channel exists after the media channel is successfully established by the first establishment component 501.

Figure 8:
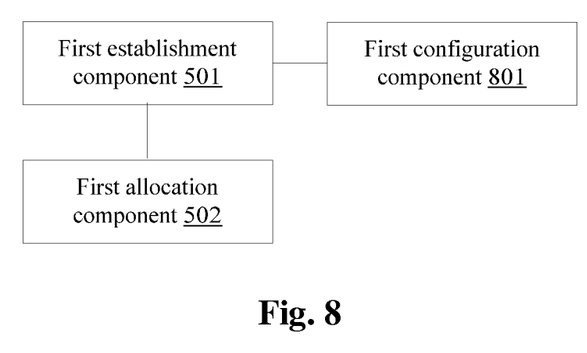
FIG. 8 is a schematic diagram illustrating a fourth structure of a channel establishment device according to an embodiment of the disclosure.

FIG. 8 is a schematic diagram illustrating a fourth structure of a channel establishment device according to an embodiment of the disclosure. As shown in FIG. 8, in an example embodiment, the channel establishment device further includes:

a first configuration component 801 configured to switch one or more frequency slots on the nodes which the media channel established by the first establishment component 501 passes.

Figure 9:
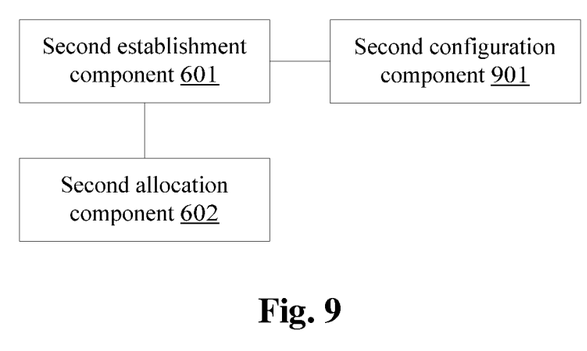
FIG. 9 is a schematic diagram illustrating a fifth structure of a channel establishment device according to an embodiment of the disclosure.

FIG. 9 is a schematic diagram illustrating a fifth structure of a channel establishment device according to an embodiment of the disclosure. As shown in FIG. 9, in an example embodiment, the channel establishment device further includes:

a second configuration component 901 configured to switch one or more single signal frequency slots on the intermediate nodes which the signal channel established by the second establishment component 601 passes.

In an example embodiment, the first establishment component 501 is further configured to release the available frequency spectrum of the optical fiber to a control plane via a routing protocol in the lower-layer media network where the media channel exists, wherein the optical fiber supports at least one frequency slot; and the second establishment component 601 is further configured to release the available frequency spectrum of the traffic engineering link to a control plane via a routing protocol in the upper-layer signal network which is corresponding to the lower-layer media network, wherein the traffic engineering link supports at least one single signal frequency slot.

To elaborate the channel establishment method provided in the embodiments of the disclosure more clearly and more plainly, the channel establishment method is described below with reference to specific embodiments.

Embodiment 1

An end-to-end channel establishment method is provided in the embodiment which specifically includes the following processing steps.

One media channel which can pass frequency slot matrixes of a plurality of intermediate nodes and the optical fiber between nodes is created between two nodes, the available frequency spectrum of the optical fiber is allocated for the media channel, and one or more frequency slots are switched on the intermediate nodes the media channel passes.

The media channel is capable of supporting more than one single signal frequency slot. One traffic engineering link is formed in an upper-layer signal network after the media channel is created. A plurality of signal channels may pass the traffic engineering link formed by the media channel in the upper-layer network.

A signal channel which may pass single signal frequency slot matrixes of a plurality of intermediate nodes and the traffic engineering links between a plurality of nodes is created between two nodes, the available frequency spectrum of the traffic engineering links between the plurality of nodes is allocated for the signal channel, and one or more single signal frequency slots are switched on the intermediate nodes the signal channel passes.

The frequency slot may be a fixed or flexible grid. The single signal frequency slot may be a fixed or flexible grid.

A traffic engineering link the available frequency spectrum of which is the same as the frequency spectrum of the media channel is formed in an upper-layer signal network after the media channel is created.

A traffic engineering link may be directly formed in an upper-layer signal network when two nodes are directly connected via an optical fiber in a media network layer, wherein the maximum available frequency spectrum of the traffic engineering link is equal to maximum available frequency spectrum of the optical fiber of a lower-layer media network.

In the media network layer, the available frequency spectrum supported by the optical fiber is released to a control plane via a routing protocol. The optical fiber can support a plurality of frequency slots.

In a signal network layer, the available frequency spectrum supported by the traffic engineering link is released to a control plane via a routing protocol. The traffic engineering link can support a plurality of single signal frequency slots. The routing protocol includes OSPF-TE and ISIS-TE.

Embodiment 2

Combining with specific nodes in a network, an end-to-end channel establishment method is provided in the embodiment.

Figure 10:
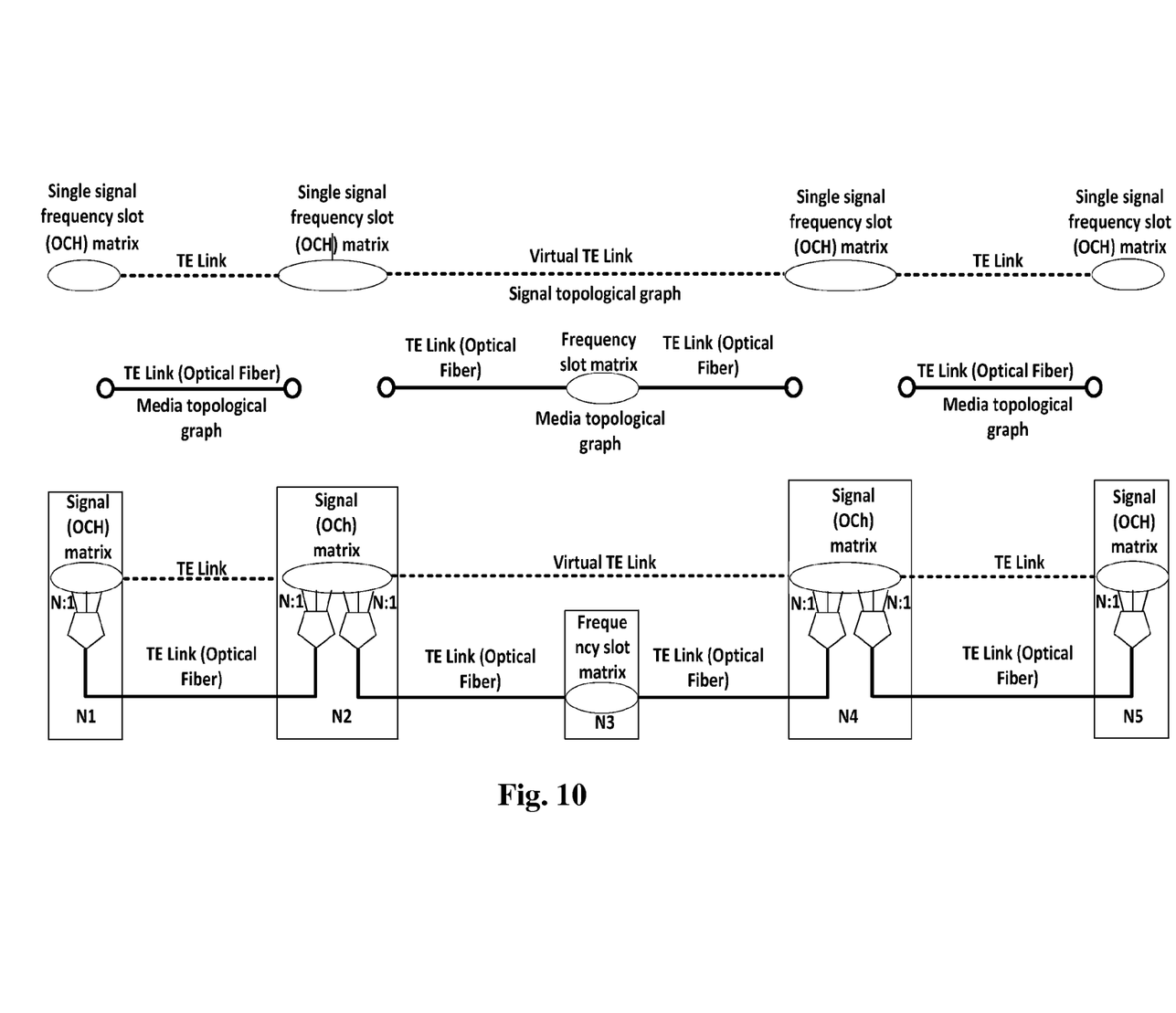
FIG. 10 is a topological graph illustrating the hierarchical management on the frequency spectrum of an optical network according to an embodiment of the disclosure.
Figure 11:
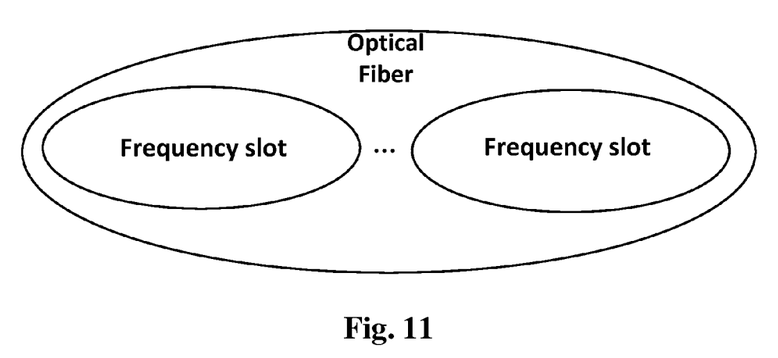
FIG. 11 is a structural diagram illustrating the management on the frequency spectrum resource of an optical fiber capable of supporting a plurality of frequency slots according to an embodiment of the disclosure.

FIG. 10 is a topological graph illustrating the hierarchical management on the frequency spectrum of an optical network according to an embodiment of the disclosure. As shown in FIG. 10, in a media network layer, the available frequency spectrum (e.g. the 1000 GHz available frequency spectrum shown in FIG. 10) of a frequency slot supported by an optical fiber is released to a control plane via a routing protocol. FIG. 11 is a structural diagram illustrating the management on the frequency spectrum resource of an optical fiber according to an embodiment of the disclosure. As shown in FIG. 11, the optical fiber is capable of supporting a plurality of frequency slots.

A media channel which passes frequency slot matrixes of a plurality of intermediate nodes (e.g. N3) and the optical fiber between nodes is created between two nodes (e.g. N2 and N4), the available frequency spectrum of the optical fiber is allocated to the media channel (for example, 500 GHz frequency spectrum is allocated to the media channel), and one or more frequency slots are switched on the intermediate nodes the media channel passes. The frequency slot is a fixed or flexible grid.

Figure 12:
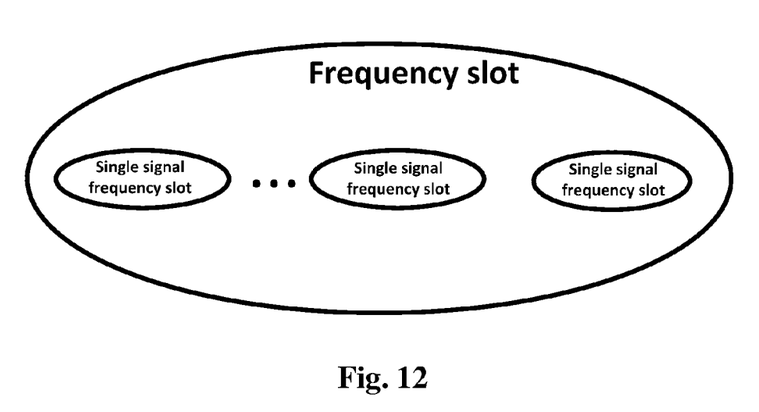
FIG. 12 is a structural diagram illustrating the frequency spectrum resource management in a frequency slot supporting a plurality of single signal frequency slots according to an embodiment of the disclosure.

FIG. 12 is a structural diagram illustrating the frequency spectrum resource management in a frequency slot according to an embodiment of the disclosure. As shown in FIG. 12, the media channel is capable of supporting more than one single signal frequency slot which may be a fixed or flexible grid.

A traffic engineering link the available frequency spectrum of which is 500 GHz, for example, the Virtual TE link shown in FIG. 10 between nodes N2 and N4, is formed in an upper-layer signal network after the media channel is created. A plurality of signal channels may pass the traffic engineering link formed by the media channel in the upper-layer network. The available frequency spectrum of the traffic engineering link is the same as the frequency spectrum of the media channel.

In a signal network layer, the available frequency spectrum (that is, 500 GHz) of the single signal frequency slot supported by the traffic engineering link is released to a control plane via a routing protocol. The traffic engineering link can support a plurality of single signal frequency slots.

A traffic engineering link can be directly formed in an upper-layer signal network when two nodes are directly connected via an optical fiber in a media network layer, wherein the available frequency spectrum of the traffic engineering link is 1000 GHz, equal to the available frequency spectrum of the optical fiber of the lower-layer media network. As shown in FIG. 10, the optical fiber between N1 and N2 and the optical fiber between N4 and N5 can directly form two traffic engineering links in a signal layer network.

In this way, in the signal layer network, related topological information, including a single signal frequency slot matrix and a traffic engineering link, can be seen by a path computation element.

After the traffic engineering link is formed, a signal channel which can pass single signal frequency slot matrixes of a plurality of intermediate nodes and the traffic engineering link between nodes is created between two nodes, the available frequency spectrum of the traffic engineering link between nodes is allocated to the signal channel, and one or more single signal frequency slots are switched on the intermediate nodes the signal channel passes.

Embodiment 3

A method of establishing an end-to-end frequency spectrum channel through a management plane or control plane is provided in the embodiment from the aspects of flow and examples, the processing flow of the method including the following steps S1 to S7.

Step S1: a management or control plane obtains the topology structure of an optical network (including the nodes in the network and the optical fibers between nodes) and detailed information of each optical fiber (link), the information including the available frequency spectrum (including available central frequency and the width of the frequency spectrum) supported by the link.

Step S2: a path computation entity (e.g., a Path Computation Element (PCE)) of the management or control plane computes the end-to-end route of a media channel using the topology information obtained in Step S1 to obtain the route of an end-to-end media channel.

Figure 13:
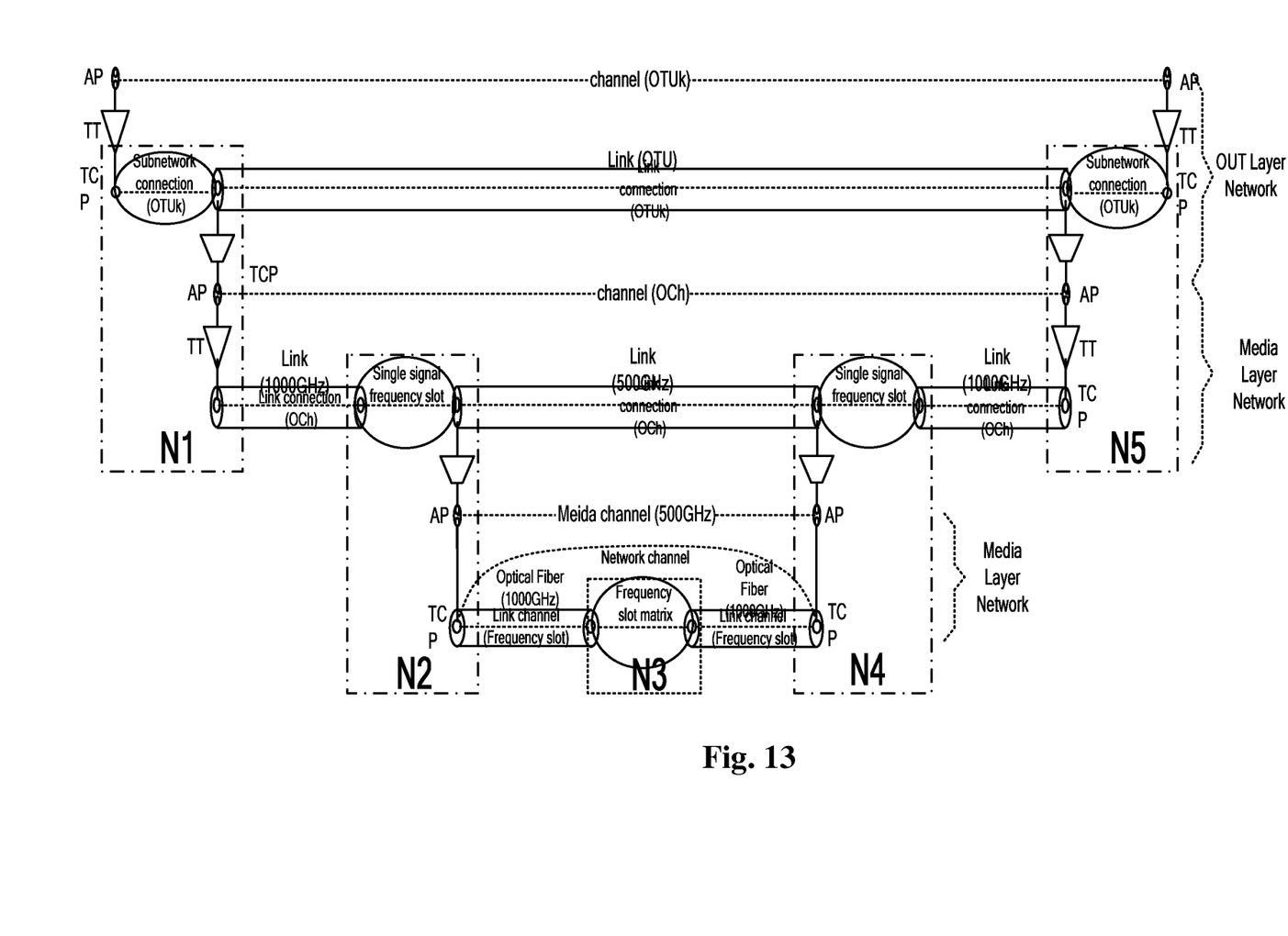
FIG. 13 is a diagram illustrating an embodiment of the hierarchical management on the frequency spectrum of an optical network according to an embodiment of the disclosure.

For example, FIG. 13 is a diagram illustrating an embodiment of the hierarchical management on the frequency spectrum of an optical network according to an embodiment of the disclosure. As shown in FIG. 13, the PCE calculates the route of the media channel which is located between nodes N2 and N4 and the frequency spectrum of which is 500 GHz, the media channel passing the optical fiber between nodes N2 and N3 and the optical fiber between nodes N3 and N4 and the frequency slot matrix of the node N3.

Step S3: after the route computation is completed, the nodes and the link the media channel passes and the frequency spectrum needed by the link are determined, an end-to-end media channel is established through the signaling of the management or control plane, one or more frequency slots are switched on the intermediate nodes the end-to-end media channel passes, and the available frequency spectrum of the optical fiber is allocated for the media channel.

As shown in FIG. 13, a media channel is established through the signaling of the management or control plane after the route computation is completed, the 500 GHz frequency spectrum of the optical fiber is allocated to the media channel, and one or more frequency slots are switched on the node N3.

Step S4: the media channel is capable of supporting more than one single signal frequency slot, for example, a plurality of ODU4/OTU4/OCh signals the frequency spectrum width of which is 50 GHz. A traffic engineering link is formed in an upper-layer signal network after the media channel is created. A plurality of signal channels may pass the traffic engineering link formed by the media channel in the upper-layer network. The available frequency spectrum of the traffic engineering link is the same as the frequency spectrum of the media channel.

As shown in FIG. 13, after a 500 GHz media channel is created between nodes N2 and N4, and a traffic engineering link is created between nodes N2 and N4 in an upper-layer signal network, wherein the maximum available frequency spectrum of the traffic engineering link is 500 GHz. A plurality of signal channels, for example, a plurality of 100G signal channels the frequency spectrum of which is 50 GHz, may pass the traffic engineering link.

Step S5: a traffic engineering link can be directly formed in an upper-layer signal network when two nodes are directly connected via an optical fiber in a media network layer, wherein the available frequency spectrum of the traffic engineering link is equal to available frequency spectrum of the optical fiber of a lower-layer media network.

As shown in FIG. 13, two traffic engineering links are directly formed between the nodes N1 and N2 and between the nodes N4 and N5 in the upper-layer signal network when nodes N1 and N2 and nodes N4 and N5 are both directly connected via an optical fiber, wherein the available frequency spectrum of the traffic engineering link is 1000 GHz, equal to available frequency spectrum of the optical fiber.

Step S6: the PCE of the management or control plane computes an end-to-end signal channel route using the topology information obtained in Steps S4 and S5 to obtain the route of an end-to-end signal channel.

As shown in FIG. 13, the PCE computes a signal channel route between nodes N1 and N5, the signal channel, the rate of which is 100G and the frequency spectrum of which is 50 GHz, passes the traffic engineering link between nodes N1 and N2, the traffic engineering link between nodes N4 and N5 and the traffic engineering link between nodes N2 and N4 and single signal frequency slot matrixes of nodes N2 and N4.

Step S7: after the route is computed, the nodes and the link the signal channel passes and the frequency spectrum needed by the link are determined, the end-to-end signal channel is established through signaling of the management or control plane, one or more single signal frequency slots are switched on the one or more intermediate nodes the end-to-end signal channel passes, and the available frequency spectrum, for example, 50 GHz, of the traffic engineering link is allocated for the signal channel.

As shown in FIG. 13, a signal channel is established through signaling of the management or control plane after the route computation is completed and allocated with the 50 GHz frequency spectrum of the traffic engineering links between nodes N1 and N2, between nodes N2 and N4 and between nodes N4 and N5, and one or more frequency slots are switched on the nodes N2 and N4.

INDUSTRIAL APPLICABILITY

The embodiments of the disclosure puts emphasis on providing a frequency spectrum resource management method and system to improve the utilization rate of frequency spectrum and rationally plan frequency spectrum resource after a flexible grid technology is introduced into a beyond-100G system, thereby improving the overall frequency spectrum utilization rate of the network of the operator and effectively reducing the network management and investment cost of the operator.

It can be seen from the description above that the embodiments described herein achieve the following technical effects.

In the embodiments of the disclosure, a media channel supporting at least one single signal frequency slot is established between a first node and a second node and allocated with frequency spectrum from available frequency spectrum of an optical fiber. As a result, the media channel can support at least one single signal frequency slot, thus providing hierarchical management and planning from the point of view of frequency spectrum management. This frequency spectrum management mode can improve the utilization rate of frequency spectrum and rationally plan frequency spectrum resource to improve the overall frequency spectrum utilization rate of the network of the operator and effectively reduce the network management and investment cost of the operator after a flexible grid technology is introduced into a beyond-100G system.

Apparently, it should be appreciated by those skilled in the art that each component or step described in the invention can be realized by a universal computer and that the components or steps may be integrated on a single computer or allocated on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the invention is not limited to the combination of specific hardware and software.

The mentioned above is only example embodiments of the invention but not limitation to the invention, it should be appreciated that various modification and variations can be devised by those of ordinary skill in the art. Any modification, substitute or improvement devised without departing from the scope of the disclosure should fall within the protection scope as defined by the appended claims of the disclosure.

What is claimed is:

1. A channel establishment method, comprising:
    establishing a media channel between a first node and a second node, wherein the first node is a source node of the media channel, the second node is a destination node of the media channel, and the media channel passes a frequency slot matrix of one or more intermediate nodes between the first node and the second node and an optical fiber between any two nodes;
    allocating frequency spectrum to the media channel from available frequency spectrum of the optical fiber, wherein the media channel supports at least one single signal frequency slot;
    establishing a signal channel between a third node and a fourth node, wherein the third node is a source node of the signal channel and the fourth node is a destination node of the signal channel, and the signal channel passes a frequency slot matrix of one or more intermediate nodes between the third node and the fourth node and a traffic engineering link between any two nodes; and
    allocating frequency spectrum to the signal channel from available frequency spectrum of the traffic engineering link;
    wherein the traffic engineering link is formed in the following manner:
    after the media channel is successfully established, the traffic engineering link, which supports at least one signal channel, and the available frequency spectrum of which is the same as the frequency spectrum of the media channel, is formed between the first node and the second node in an upper-layer signal network which is corresponding to a lower-layer media network where the media channel exists.

2. The method according to claim 1, wherein the traffic engineering link is formed in the following manner:
    in a case where any two nodes are directly connected with each other merely by an optical fiber, one traffic engineering link, the available frequency spectrum of which is the same as available frequency spectrum of the optical fiber, is formed in an upper-layer signal network which is corresponding to a lower-layer media network where the media channel exists.

3. The method according to claim 1, wherein after the media channel is established between the first node and the second node, the method further comprises: switching one or more frequency slots on the nodes the media channel passes.

4. The method according to claim 1, wherein after the signal channel is established between the third node and the fourth node, the method further comprises: switching one or more single signal frequency slots on the nodes the signal channel passes.

5. The method according to claim 1, wherein the frequency slot is a fixed or flexible grid.

6. The method according to claim 1, wherein the single signal frequency slot is a fixed or flexible grid.

7. The method according to claim 1, wherein
    the available frequency spectrum of the optical fiber is released to a control plane via a routing protocol in the lower-layer media network where the media channel exists, wherein the optical fiber supports at least one frequency slot; and
    the available frequency spectrum of the traffic engineering link is released to a control plane via a routing protocol in the upper-layer signal network which is corresponding to the lower-layer media network, wherein the traffic engineering link supports at least one single signal frequency slot.

8. The method according to claim 7, wherein the routing protocol includes Open Shortest Path First-Traffic Engineering (OSPF-TE) and ISIS-TE (Intermediate System to Intermediate System-Traffic Engineering).

9. A channel establishment device, comprising:
    a first establishment component configured to establish a media channel between a first node and a second node, wherein the first node is a source node of the media channel, the second node is a destination node of the media channel, and the media channel passes a frequency slot matrix of one or more intermediate nodes between the first node and the second node and an optical fiber between any two nodes;
    a first allocation component configured to allocate frequency spectrum to the media channel from available frequency spectrum of the optical fiber, wherein the media channel supports at least one single signal frequency slot;
    a second establishment component configured to establish a signal channel between a third node and a fourth node, wherein the third node is a source node of the signal channel and the fourth node is a destination node of the signal channel, and the signal channel passes a frequency slot matrix of one or more intermediate nodes between the third node and the fourth node and a traffic engineering link between any two nodes;

a second allocation component configured to allocate frequency spectrum to the signal channel from available frequency spectrum of the traffic engineering link; and a forming component configured to form, between the first node and the second node, a traffic engineering link which supports at least one signal channel and the available frequency spectrum of which is the same as the frequency spectrum of the media channel in an upper-layer signal network which is corresponding to a lower-layer media network where the media channel exists, after the media channel is successfully established by the first establishment component.

10. The device according to claim 9, further comprising:
a first configuration component configured to switch one or more frequency slots on the nodes which the media channel established by the first establishment component passes.

11. The device according to claim 9, further comprising:
a second configuration component configured to switch one or more single signal frequency slots on the nodes which the signal channel established by the second establishment component passes.

12. The device according to claim 9, wherein
the first establishment component is further configured to release the available frequency spectrum of the optical fiber to a control plane via a routing protocol in a lower-layer media network where the media channel exists, wherein the optical fiber supports at least one frequency slot; and the second establishment component is further configured to release the available frequency spectrum of the traffic engineering link to a control plane via a routing protocol in an upper-layer signal network which is corresponding to the lower-layer media network, wherein the traffic engineering link supports at least one single signal frequency slot.

\* \* \* \* \*